(12) United States Patent
Takahashi

(10) Patent No.: US 7,515,364 B2
(45) Date of Patent: Apr. 7, 2009

(54) OBJECTIVE LENS ACTUATOR AND OPTICAL PICKUP DEVICE HAVING THE SAME

(75) Inventor: Kazuhiro Takahashi, Osaka (JP)

(73) Assignee: Funai Electric Co., ltd., Osaka (JP)

( * ) Notice: Subject to any disclaimer, the term of this patent is extended or adjusted under 35 U.S.C. 154(b) by 18 days.

(21) Appl. No.: 11/902,792

(22) Filed: Sep. 25, 2007

(65) Prior Publication Data
US 2008/0088954 A1 Apr. 17, 2008

(30) Foreign Application Priority Data
Sep. 26, 2006 (JP) .............................. 2006-259946

(51) Int. Cl.
G02B 7/02 (2006.01)
(52) U.S. Cl. ........................ 359/813; 359/811; 359/819; 359/821; 359/822
(58) Field of Classification Search ................ 359/813, 359/819, 822, 823, 811, 821
See application file for complete search history.

(56) References Cited

U.S. PATENT DOCUMENTS

| 6,392,819 B1 | 5/2002 | Harada | |
|---|---|---|---|
| 2006/0181970 A1* | 8/2006 | Miyagi | 369/44.14 |

FOREIGN PATENT DOCUMENTS

| EP | 1 426 938 A1 | 6/2004 |
|---|---|---|
| JP | A-H11-120602 | 4/1999 |
| JP | A-H11-312333 | 11/1999 |
| JP | A-2005-174485 | 6/2005 |
| JP | A-2006-019001 | 1/2006 |

* cited by examiner

Primary Examiner—Jessica T Stultz
Assistant Examiner—Mahidere S Sahle
(74) Attorney, Agent, or Firm—Morgan Lewis & Bockius LLP

(57) ABSTRACT

In a lens holder included in an objective lens actuator, a first holding hole to hold a first objective lens and a second holding hole to hold a second objective lens are arranged. In the first holding hole, two supporting portions to support the first objective lens are arranged and they are disposed oppositely in a radial direction to sandwich an optical axis of the first objective lens. In the second holding hole, two supporting portions to support the second objective lens are arranged and they are disposed oppositely in a tangential direction to sandwich an optical axis of the second objective lens.

8 Claims, 5 Drawing Sheets

TANGENTIAL DIRECTION

RADIAL DIRECTION

F I G. 8
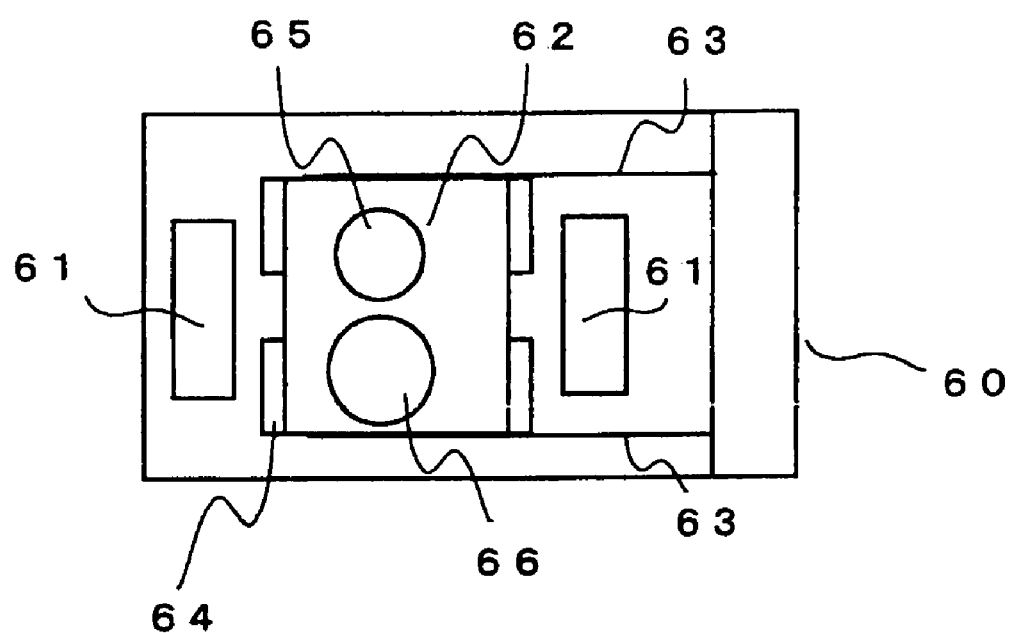

OBJECTIVE LENS ACTUATOR AND OPTICAL PICKUP DEVICE HAVING THE SAME

This application is based on Japanese Patent Application No. 2006-259946 filed on Sep. 26, 2006, and the contents of which are hereby incorporated by reference.

BACKGROUND OF THE INVENTION

1. Field of the Invention

The present invention relates to an objective lens actuator that is included in an optical pickup device which projects a light beam to an optical recording medium so as to become possible recording of information or reading of information. More particularly, the present invention relates to a structure of the objective lens actuator which has a plurality of objective lenses. Further, the present invention relates to the optical pickup device which has the objective lens actuator structured as above described.

2. Description of Related Art

Optical recording media including a compact disc (hereinafter referred to as a CD) and a digital versatile disc (hereinafter referred to as a DVD) are widely spread. Furthermore in recent years, for a purpose of increasing quantity of information on the optical recording medium, studies about high density recording on the optical recording medium have been performed. For example, a high density optical recording medium such as a HD-DVD that is a high definition DVD and a Blu-Ray Disc (Registered Trademark; hereinafter referred to as a BD) are being available.

In an optical disc apparatus which performs recording or reproducing of such optical recording media, an optical pickup device is included which projects a light beam to the optical recording medium so as to become possible recording of information or reading of information. At this point it is necessary to make numerical aperture (NA) of the objective lens and a wavelength of light source which are used in the optical pickup device different depending of a kind of the optical recording medium. For example, for a CD, the NA of the objective lens of 0.50 and the wavelength of the light source of 780 nm are used, for a DVD, the NA of the objective lens of 0.65 and the wavelength of the light source of 650 nm are used, and for a BD, the NA of the objective lens of 0.85 and the wavelength of the light source of 405 nm are used.

As above described, in response to the kind of the optical recording medium, because the NA of the objective lens and the wavelength of the light source which are used become different, it is conceivable to use different optical pickup device for every different optical recording medium. However, it is more convenient that one optical pickup device can perform recording or reproducing of a plurality of kinds of optical recording media, and many of such optical pickup devices has been already developed. In such optical pickup device there are some devices which has a plurality of objective lenses such that the plurality of objective lenses are changed to utilize in response to the kind of the optical recording medium.

In the meantime the objective lens which is included in the optical pickup device is generally mounted on a lens holder that is included in the objective lens actuator so as to enable an adjustment in a focusing direction and in a tracking direction. As for this point, situation is the same in the optical pickup device which has a plurality of the objective lenses, when the plurality of objective lenses are mounted on the objective lens actuator, problems as below described are caused.

When the objective lens actuator has a plurality of the objective lenses, a tilt angle adjustment of the objective lens actuator is generally performed to enable cutting down influence of coma aberration or the like utilizing an objective lens which is used mainly in the optical pickup device. In this case, if a shift in degree of parallelization between the objective lenses (hereinafter this shift may be also referred to as relative tilt) is occurred due to shift or the like of attaching angle of the objective lens to the lens holder, the coma aberration is generated when another objective lens is used which is not utilized for the tilt angle adjustment of the objective lens actuator, therefore, quality of reading information or the like by the optical pickup device becomes worse.

Because of this, up to now, various technology which suppresses occurrence of this relative tilt, has been proposed. In JP-A-H11-312333, for example, a structure has been proposed in which three bosses are formed on a lens receiving plate of the lens holder for the optical pickup device. By this arrangement, as far as accuracy of degree of horizontally of the three bosses are maintained, degree of verticality between the objective lens and a supporting shaft can be guaranteed, and degree of parallelization between the objective lenses can be maintained each other.

Further, in JP-A-2006-019001, a structure has been proposed in which a lens attaching surface of at least any one of attaching hole among a plurality of attaching holes which are formed in the lens holder, is formed by curved surface in order to enable tilting adjusting of the objective lens. Similarly, in JP-A-2005-174485, or JP-A-H11-120602, structures have been proposed in which objective lens holding tube has curved surface or tapered surface so as to enable performing tilt angle adjustment around a principal point of the objective lens. By these arrangements, the tilt angle adjustment of the relative tilt between the objective lenses becomes possible.

However, as for the structure proposed by the JP-A-H11-312333, when mass production is thought, it is not always easy to maintain accuracy in degree of horizontally of three bosses for each of the lens attaching holes. Therefore, in the structure of JP-A-H11-312333, possibility of occurrence of the relative tilt inevitably becomes high.

Further, as for the structures proposed by JP-A-2006-019001, JP-A-2005-174485, and JP-A-H11-120602, because they have the structures in which the tilting adjustment can be performed for at least one of the objective lens between the two objective lenses, it is possible to prevent occurrence of the relative tilt. However, because the structures contain forming the curved surface or the tapered surface on the lens attaching surface or the like in order to enable tilt angle adjustment of the objective lens, dimensional control becomes necessary for the lens attaching surface or the like, as a result, an additional process for it is generated when the lens holder is manufactured. Further, because it is not always easy to slide the objective lens along a sphere or the like, in practice, a separate holder which has structure to slide smoothly along the sphere becomes necessary and the like, it causes a problem of increase in number of parts.

SUMMARY OF THE INVENTION

In view of the above described problems, it is an object of the present invention to provide an objective lens actuator whose relative tilt between the objective lenses is easy to reduce and whose manufacturing is easy in the objective lens actuator which has a plurality of objective lenses. Further another object of the present invention is to provide an optical pickup device which can reduce influence of the coma aberration because such objective lens actuator is included.

To attain the above described object, an objective lens actuator in accordance with a first aspect of the present invention includes: a first objective lens which condenses a light beam on a recording surface of an optical recording medium; a second objective lens which is used interchangeably with the first objective lens to condense a light beam on the recording surface of the optical recording medium; a lens holder which has a first holding portion to hold the first objective lens and a second holding portion to hold the second objective lens; and a driving mechanism to move the lens holder at least in a focusing direction that is parallel to an optical axis of the objective lens and in a tracking direction that is parallel to a radial direction of the optical recording medium, and the objective lens actuator is characterized by that a first supporting portion to support the first objective lens is arranged on the first holding portion, a second supporting portion to support the second objective lens is arranged on the second holding portion, the first supporting portion is composed of two portions that are disposed oppositely in a first direction to sandwich an optical axis of the objective lens to be held by the first holding portion, and the second supporting portion is composed of two portions that are disposed oppositely in a second direction to sandwich an optical axis of the objective lens to be held by the second holding portion, and the second direction is perpendicular to the first direction.

By this arrangement, the supporting portions to hold the objective lens in each of the holding portions, has a structure to support the objective lens by two points, and further, in the two holding portions, the directions in which the objective lenses can tilt are made different in 90 degree. Because of this it is possible for the relative tilt between the two objective lenses to become zero by adjustment of inclination for each of the objective lenses to be held by the holding portions, and therefore, it is easy to reduce the relative tilt. In addition, because the relative tilt can be reduced by the above described inclination adjustment, even if there is a certain degree of difference in height between the two supporting portions which are disposed in each of the holding portions in the lens holder, high accuracy dimensional management for the supporting portion is not always necessary, as a result, manufacturing of the objective lens actuator becomes easy.

Further, it is preferable in an objective lens actuator in accordance with a second aspect of the present invention that the supporting portions are formed integrated with the lens holder in the objective lens actuator structured as above described.

By this arrangement because the objective lens actuator has a structure in which the supporting portions to hold the objective lens are formed integrated with the lens holder, additional process for the supporting portions is not necessary when the objective lens actuator is manufactured, and number of parts does not increase, also.

Further, it is preferable in an objective lens actuator in accordance with a third aspect of the present invention that a part of the supporting portion contacting with the objective lens is formed as a curved surface in the objective lens actuator structured as above described.

By this arrangement it is easy to tilt the objective lens because the part of the supporting portion to support the objective lens contacting with the objective lens is formed as a curved surface.

Further, to attain the above described object an optical pickup device in accordance with a fourth aspect of the present invention includes the objective lens actuator which is structured according to any one of the above described aspects.

By this arrangement an optical pickup device in which influence of the coma aberration is reduced can be provided because the objective lens actuator having a plurality of objective lenses holds the objective lenses so as not to generate the relative tilt between the objective lenses.

BRIEF DESCRIPTION OF THE DRAWINGS

FIG. 8 is a schematic plan view to show another embodiment of the objective lens actuator to which the present invention is applied.

DETAILED DESCRIPTION OF THE PREFERRED EMBODIMENTS

Hereinafter a detailed explanation on embodiments of the present invention will be described with reference to the drawings. Here, the embodiment described here is mere an example and the present invention is not limited to the embodiment.

Figure 1:
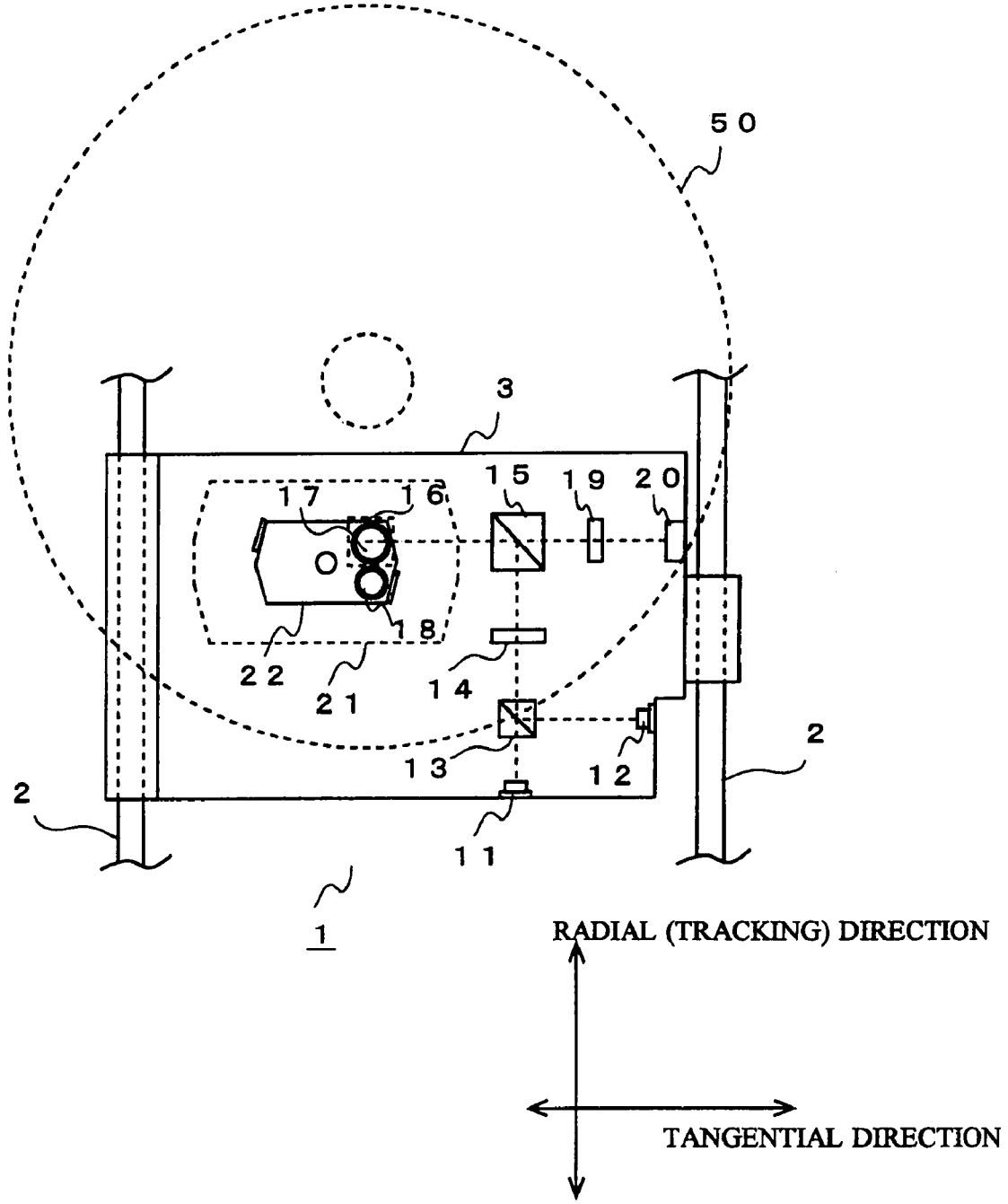
FIG. 1 is a schematic plan view to show a structure of an optical pickup device including an objective lens actuator according to the present embodiment.

FIG. 1 is a schematic plan view to show a structure of an optical pickup device including an objective lens actuator according to the present embodiment. The optical pickup device 1 performs recording information and reading information by irradiating laser beam on three kinds of optical discs (optical recording media) 50 such as a CD, a DVD and a BD. The optical pickup device 1 is supported slidably on two guide rails which are disposed in the optical disc apparatus. Because the two guide rails 2 are disposed in parallel to a radial direction of the optical disc 50, the optical pickup device is made possible to move in the radial direction.

The optical pickup device 1 is equipped with a first light source 11, a second light source 12, a dichroic prism 13, a collimator lens 14, a beam splitter 15, an upstand mirror 16, a first objective lens 17, and a second objective lens 18 in inside of it.

The first light source 11 is a laser diode which emits a single wavelength laser beam that has a wavelength of 405 nm used for a BD. The second light source 12 is a two-wavelength combination laser which can emit laser beams having two wavelengths and it emits the laser beam having a wavelength of 650 nm used for a DVD and the laser beam having a wavelength of 780 nm used for a CD. The laser beam emitted from the first light source 11 or the second light source 12 is sent to the dichroic prism 13.

The dichroic prism 13 transmits the laser beam emitted from the first light source 11 and reflects the laser beam emitted from the second light source 12. At this point the first light source 11 and the second light source 12 are disposed such that two optical axes of the laser beams output from the dichroic prism 13 become substantially the same. The laser beam output from the dichroic prism 13 is sent to the collimator lens 14.

The collimator lens 14 converts divergent rays which are emitted from the first light source 11 and the second light source 12, into parallel rays that are substantially parallel to the optical axis. The laser beam which passed the collimator lens 14 is sent to the beam splitter 15.

The beam splitter 15 reflects the laser beam which is emitted from the first light source 11 and the second light source 12 to send to the optical disc 50 side and at the same time it transmits reflected light from a recording surface (not shown) of the optical disc 50 to send a photo detector 20 side. The laser beam which is emitted from the first light source 11 or the second light source 12 and is reflected by the beam splitter 15, is sent to the upstand mirror 16.

The upstand mirror 16 reflects the laser beam sent from the beam splitter 15 at its reflection surface and makes direction of the laser beam emitted from the first light source 11 or the second light source 12 substantially perpendicular to the recording surface of the optical disc 50. The laser beam reflected by the upstand mirror 16 is sent to the first objective lens 17 or the second objective lens 18.

The first objective lens 17 and the second objective lens 18 both have functions to condense the incident laser beam on the recording surface of the optical disc 50. The first objective lens 17 is designed as an objective lens for a BD, and the second objective lens 18 is designed as an objective lens for a DVD and a CD. The first objective lens 17 and the second objective lens 18 are both mounted on a lens holder 22 which is arranged movably by an objective lens actuator 21 whose detail will be described later. The objective lens which is disposed in a light path by the objective lens actuator 21 is configured to be changed into any one of the first objective lens 17 or the second objective lens 18.

Further, the first objective lens 17 and the second objective lens 18 are made possible to move in a focusing direction which is parallel to the optical axis of the objective lens 17 or 18, and in a tracking direction which is parallel to the radial direction of the optical disc 50 by the objective lens actuator 21. By this arrangement, a focal point of the objective lens 17 or 18 is adjusted so as to be always on the recording surface of the optical disc 50 (focus adjustment), and a spot position of the laser beam condensed by the objective lens 17 or 18 is adjusted to follow a track which is formed on the optical disc 50 (tracking adjustment).

The laser beam reflected by the recording surface of the optical disc 50 passes the first objective lens 17 or the second objective lens 18, it is reflected by the upstand mirror 16, and passes the beam splitter 15. The reflected light passes through the beam splitter 15, is condensed by a condenser lens 19 on a right receiving area (not shown) of the photo detector 20.

The photo detector 20 has a role to convert a light signal received in the light receiving area (not shown) into an electric signal. Then the electric signal from the photo detector 20 is utilized as a reproduced signal to reproduce information, as an focus error signal to perform the focus adjustment, as a tracking error signal to perform the tracking adjustment and the like for the objective lenses 17, 18.

Figure 2:
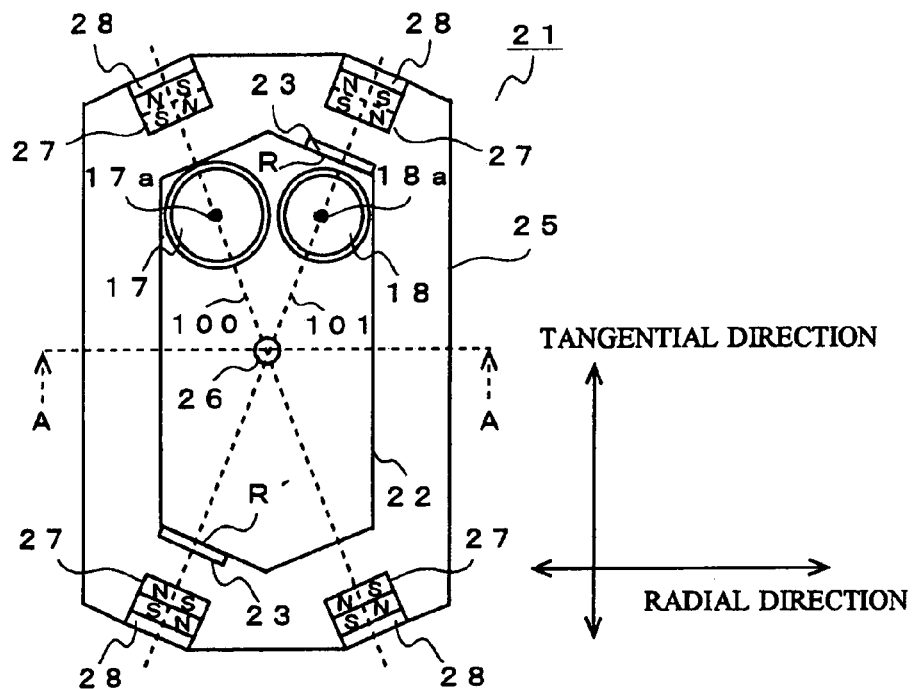
FIG. 2 is a schematic plan view to show a structure of an objective lens actuator according to the present embodiment.
Figure 3:
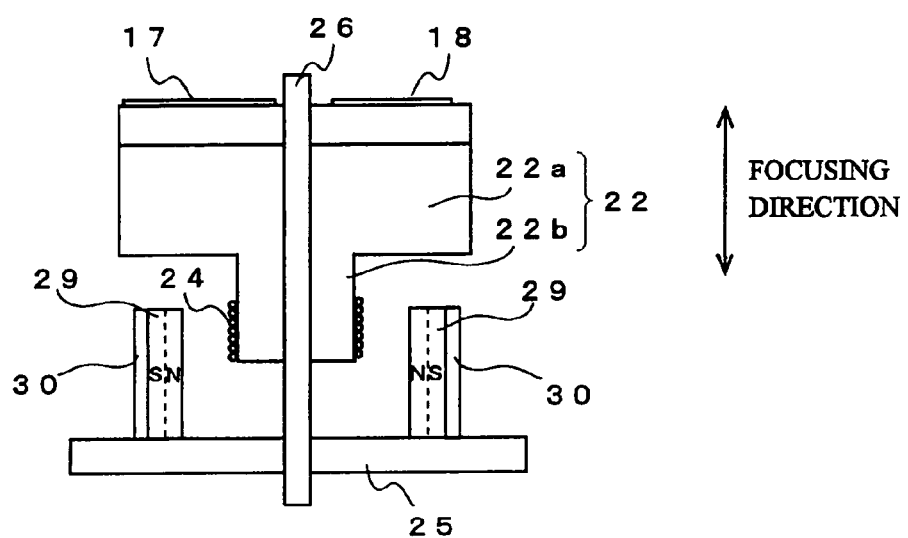
FIG. 3 is a cross sectional view when cut along a line A-A shown in FIG. 2.

Next, the objective lens actuator 21 according to the present embodiment will be described with reference mainly to FIG. 2, and FIG. 3. FIG. 2 is a schematic plan view to show a structure of an objective lens actuator 21 according to the present embodiment, and FIG. 3 is a cross sectional view of the objective lens actuator 21 when cut along a line A-A shown in FIG. 2.

The objective lens actuator 21 is equipped with the lens holder 22, tracking coils 23, a focusing coil 24, a base 25, first permanent magnets 27, first yokes 28, second permanent magnets 29, and second yokes 30.

The lens holder 22 includes a main body portion 22a which is formed in substantially a hexagon, and a tube shaped portion 22b which is formed to extend downward from a center part of lower surface of the main body portion 22a. A through hole is formed to penetrate the main body portion 22a and the tube shaped portion 22b in their central parts. A sliding shaft 26 which is mounted and fixed on the base 25 of the objective lens actuator 21 to extend in vertical direction, penetrates this through hole, it makes the lens holder 22 possible to move in an axis direction of the sliding shaft 26 and to rotate around the sliding shaft 26. Here, the base 25 which forms the objective lens actuator 21 is mounted and fixed on an optical pickup base 3 (See, FIG. 1) of the optical pickup device 1.

Further, on the main body portion 22a, holding holes (holding portions, not shown) to hold the first objective lens 17 and the second objective lens 18, are also formed. This holding holes are formed in a part located on upper side of the through hole (not shown) which penetrates the main body portion 22a, such that the laser beam emitted from the light source 11 or 12 (See, FIG. 1) can enter into the objective lens 17 or 18 from lower side. In each of the holding holes supporting portions (not shown) to support the first objective lens 17 or the second objective lens 18, are arranged, respectively. Detail of the holding hole will be described later.

The tracking coils 23 are formed respectively to be wound in a rectangle shape, and they are one pair of coils to be fixed on surfaces R, R' which oppose each other to sandwich the sliding shaft 26 in outer periphery side of the main body portion 22a of the lens holder 22. The focusing coil 24 is held to be wound on the tube shaped portion 22b of the lens holder 22.

The four first permanent magnets 27 are disposed on the base 25 to control rotating movement of the lens holder 22 along with the tracking coils 23. Two of the four first permanent magnets 27 are disposed to oppose in a symmetric position with respect to the sliding shaft 26 as a center of symmetry on an extended position of a line 100 connecting the sliding shaft 26 and a center point 17a of the first objective lens 17. Other two of the four first permanent magnets 27 are disposed also to oppose in a symmetric position with respect to the sliding shaft 26 as a center of symmetry on an extended position of a line 101 connecting the sliding shaft 26 and a center point 18a of the second objective lens 18. The first permanent magnets 27 are disposed such that magnetic poles of them are aligned as shown in FIG. 2, and at outer surface side of the first permanent magnets 27 the first yokes 28 are disposed respectively.

The two second permanent magnets 29 are disposed on the base 25 to control movement of the lens holder 22 in the axis direction (axis direction of the sliding shaft 26) along with the focusing coil 24. The second permanent magnets 29 are disposed to oppose in a symmetric position with respect to the sliding shaft 26 as a center of symmetry in a parallel direction with the radial direction. The second permanent magnets 29 are disposed such that magnetic poles of them are aligned as shown in FIG. 2, and at outer surface side of the second permanent magnets 29 the second yokes 30 are disposed respectively.

Next, an operation of the objective lens actuator 21 which is structured as above described will be described briefly. When current is passed in the tracking coils 23, the lens holder 22 moves to rotate with respect to the sliding shaft 26 as a center by an electromagnetic action between the current and a magnetic field which is generated by the first permanent magnets 27 that are disposed in the position opposed to the tracking coils 23. At this point, the lens holder 22 can be rotate largely by increasing the current passing through the tracking coils 23. By this arrangement it becomes possible to change the first objective lens 17 and the second objective lens 18. In addition, because the lens holder 22 rotates slightly, when small current is passed in the tracking coils 23, it becomes possible to perform the above described tracking adjustment by controlling a direction in which the current passes.

Here, a state shown in FIG. 2 is that the first objective lens 17 is disposed in the light path. To dispose the second objective lens 18 in the light path, it is necessary to rotate the lens holder 22 in counter clockwise. On the other hand, to change the objective lens disposed in the light path from the second objective lens 18 to the first objective lens 17, it is necessary to rotate the lens holder 22 in clockwise.

When current is passed in the focusing coil 24, it becomes possible for the lens holder 22 to move up and down in the axial direction of the sliding shaft 26 by an electromagnetic action between the current and a magnetic field which is generated by the second permanent magnets 29. By this arrangement it becomes possible to perform the above described focusing adjustment by controlling a direction in which the current passes through the focusing coil 24. That is to say, the tracking coils 23, the focusing coil 24, the first permanent magnets 27, and the second permanent magnets 29 function as a driving mechanism to drive the lens holder 22.

In a case where two objective lenses of the first objective lens 17 and the second objective lens 18 are mounted on the lens holder 22 in the present embodiment as above described, if a shift in degree of parallelization between the first objective lens 17 and the second objective lens 18 is occurred, i.e., if the relative tilt is occurred between the objective lenses, it causes a problem of occurrence of the coma aberration when the objective lens which is not the main one (in the present embodiment, the second objective lens 18 for a DVD and a CD corresponds to it) is used as above described. Because of this, it is necessary for the both objective lenses to be disposed on the lens holder 22 so as not to generate the relative tilt between the first objective lens 17 and the second objective lens 18.

Figure 4:
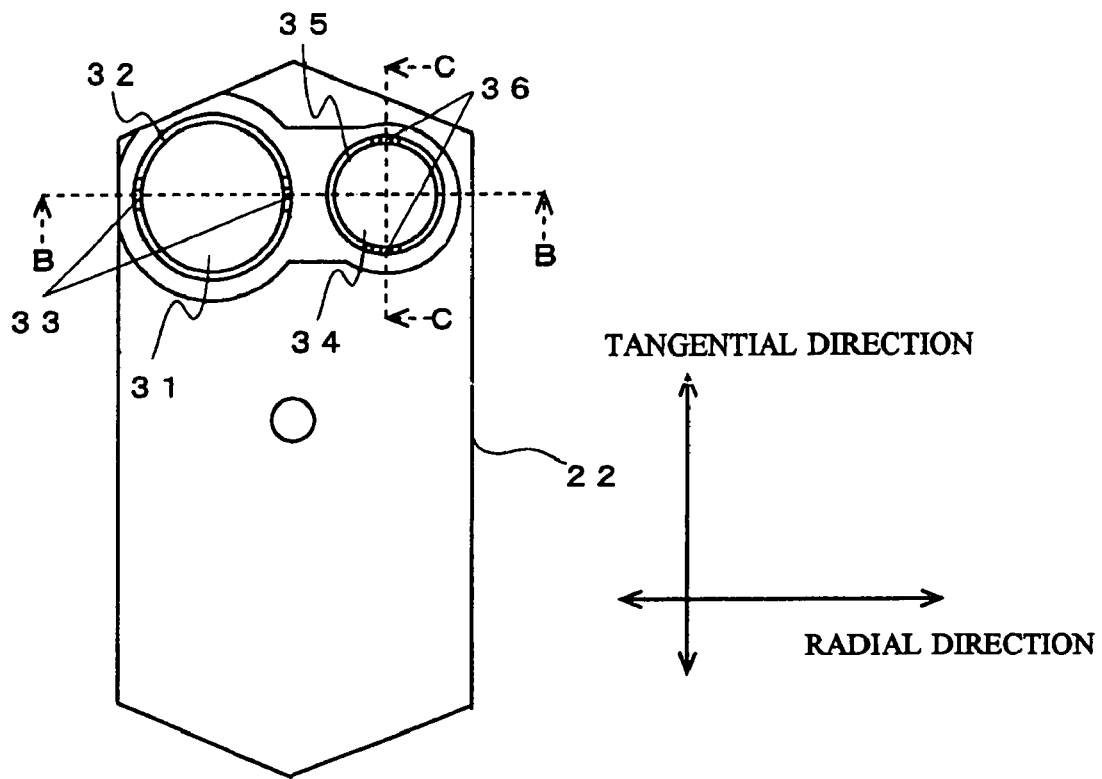
FIG. 4 is a schematic plan view of a lens holder utilized in the objective lens actuator according to the present embodiment when viewed from a holding hole side.
Figure 5:
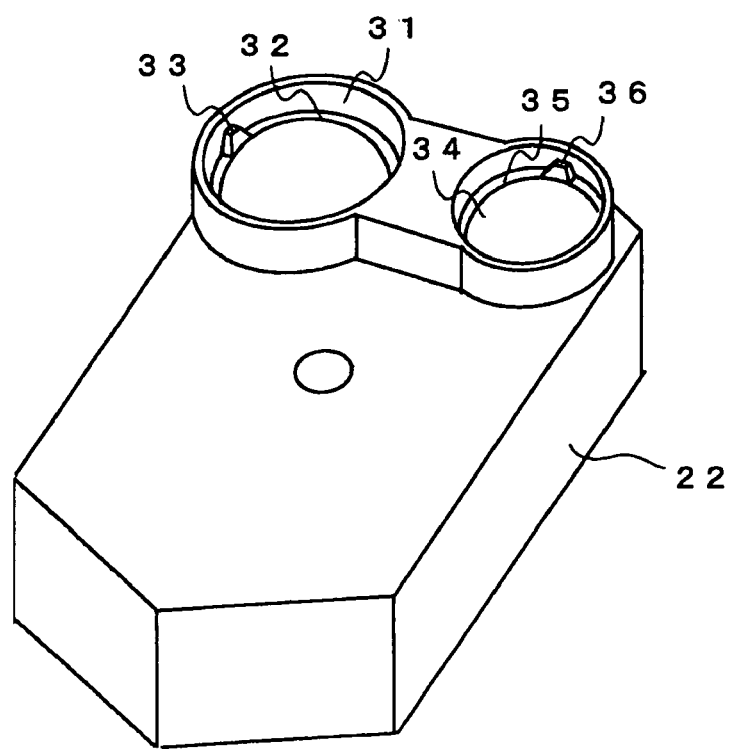
FIG. 5 is a schematic perspective view to show a structure of the lens holder utilized in the objective lens actuator according to the present embodiment.

The structure of the two holding holes (holding portion) to hold the first objective lens 17 and the second objective lens 18 on the lens holder 22 in the present embodiment is configured in consideration for the above described point. The structure will be described hereinafter with reference to FIG. 4 and FIG. 5. FIG. 4 is a schematic plan view of the lens holder 22 when viewed from the holding hole side, and FIG. 5 is a schematic perspective view to show a structure of the lens holder 22.

Figure 6:
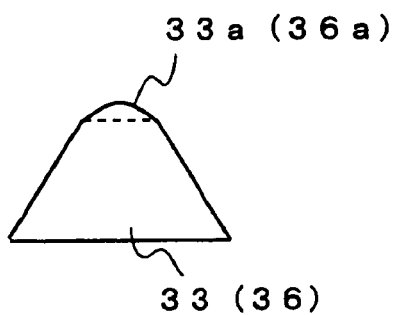
FIG. 6 is a schematic side view to show a shape of supporting portion which is disposed in the holding hole of the lens holder utilized in the objective lens actuator according to the present embodiment.

On the first holding hole 31 in which the first objective lens 17 is held, a flange portion 32 is arranged along its inner periphery at a prescribed depth part from top surface. At two opposing parts on the flange portion 32 supporting portions 33 to hold the first objective lens 17 are arranged. To be more detailed, the supporting portions 33 are configured so as to oppose each other in the radial direction to sandwich the optical axis (it corresponds to a straight line which passes a center of the first holding hole 31 in a direction perpendicular to the face of FIG. 4) of the first objective lens 17 which is mounted on the first holding hole 31. A shape of the supporting portion 33 is such that its cross section becomes narrower as it goes from lower side to upper side, and an upper side of the supporting portion 33 (part where the objective lenses 17, 18 contact with the supporting portion 33) is formed as a curved surface 33a as shown in FIG. 6. At this point, FIG. 6 is a schematic side view to show a shape of the supporting portion 33 in the present embodiment.

On the other hand as for the second holding hole 34 to hold the second objective lens 18, similar to the first holding hole 31, a flange portion 35 is arranged along its inner periphery at a prescribed depth part from top surface. At two opposing parts on the flange portion 35, supporting portions 36 to hold the second objective lens 18 are arranged. To be more detailed, the supporting portions 36 are configured so as to oppose each other in a tangential direction to sandwich the optical axis (it corresponds to a straight line which passes a center of the second holding hole 34 in a direction perpendicular to the face of FIG. 4) of the second objective lens 18 which is mounted on the second holding hole 34. A shape of the supporting portion 36 is the same as that of the supporting portion 33.

Here in the present embodiment, the flange portions 32, 35 and the supporting portions 33, 36 are formed integrated with the lens holder 22. However, a structure and the like may be no problem in that these members are made separately and assembled to the lens holder 22, of course. In addition, the flange portions 32, 35 are formed in the present embodiment, however, a structure may be no problem in that the supporting portions 33, 36 are directly formed at the inner periphery of the holding holes 31, 34 to hold the objective lenses 17, 18 without arranging the flange portions 32, 35.

Further in the present embodiment, the structure is employed in which the supporting portions 33, 36 are formed in the holding holes 31, 34. However, the present invention is not limited to this structure. A structure may be no problem, of course, in which the holding portions for the objective lens 17, 18 are not the holding holes and the supporting portions 33, 36 are formed on the upper surface of the lens holder 22 near by the through hole which is formed such that the laser beam emitted from the light source 11 or 12 can enter into the objective lens 17 or 18, for example. However in this case also, it is necessary that the structure is configured to perform surely fixing of the objective lenses 17, 18. By these reasons, the structure is preferable in that the holding holes 31, 34 hold the objective lenses 17, 18 as the present embodiment.

In the present embodiment, the supporting portion 33 formed in the first holding hole 31 and the supporting portion 36 formed in the second holding hole 34 are structured such that their opposing directions intersect perpendicularly each other. Because of this structure, it becomes possible to suppress the occurrence of relative tilt. About this point further explanation will be given with reference to FIG. 7A and FIG. 7B. At this point, FIG. 7A is an explanatory diagram to explain action of the supporting portions 33, 36 to show schematically a cross section when cut along a line B-B shown in FIG. 4, and FIG. 7B is an explanatory diagram to explain action of the supporting portions 33, 36 to show schematically a cross section when cut along a line C-C shown in FIG. 4.

Figure 7A:
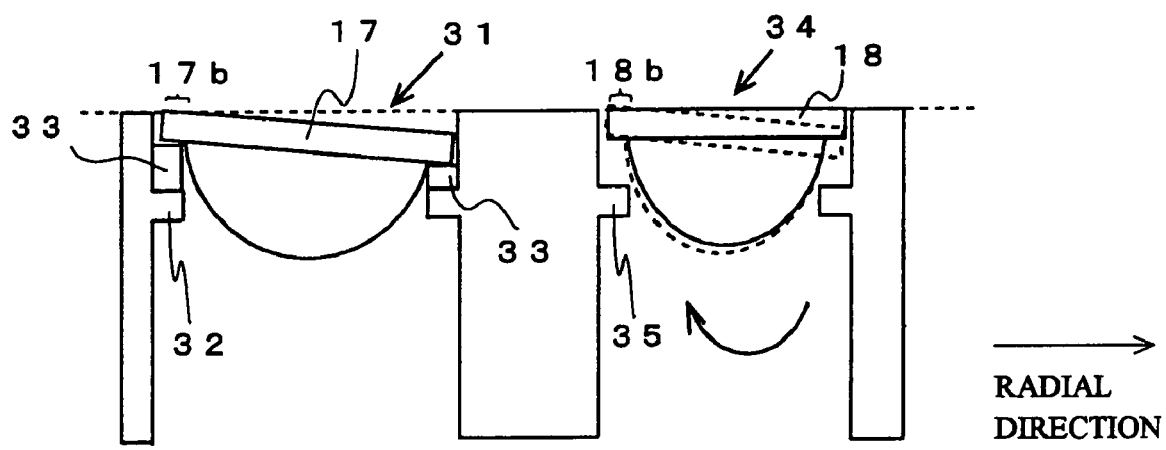
FIG. 7A is an explanatory diagram to explain action of the supporting portions arranged in the holding hole of the lens holder to show schematically a cross section when cut along a line B-B shown in FIG. 4.

As shown in FIG. 7A, in a case if the first objective lens 17 has an inclination in the radial direction (in FIG. 7A right side of it shows falling down), inclinations in the radial direction of the first objective lens 17 and the second objective lens 18 can be matched when the second objective lens 18 is rotated with respect to the supporting portions 36 which exist to sandwich the optical axis of the second objective lens 18 along the line perpendicular to the surface of the drawing as a supporting point, i.e., in case of FIG. 7A, it is rotated in clockwise (direction shown in arrow in FIG. 7A).

Figure 7B:
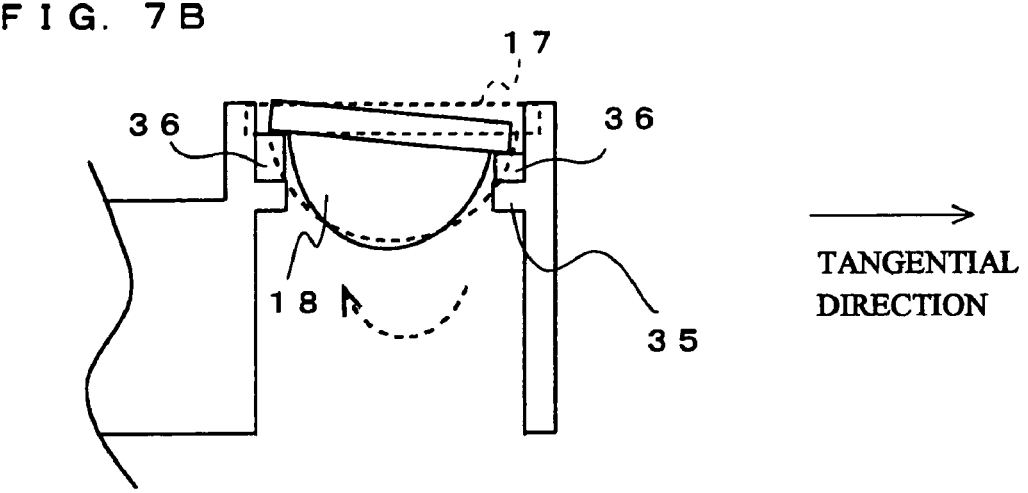
FIG. 7B is an explanatory diagram to explain action of the supporting portion arranged in the holding hole of the lens holder to show schematically a cross section when cut along a line C-C shown in FIG. 4.

In addition, as shown in FIG. 7B, in a case if the second objective lens 18 has an inclination in the tangential direction (in FIG. 7B right side of it shows falling down), inclinations in the tangential direction of the first objective lens 17 and the second objective lens 18 can be matched when the first objective lens 17 (the objective lens shown in broken line in FIG. 7B) is rotated with respect to the supporting portions 33 which exist to sandwich the optical axis of the first objective lens 17 along the line perpendicular to the surface of the drawing as a supporting point, i.e., in case of FIG. 7B, it is rotated in clockwise (direction shown in arrow in FIG. 7B).

Therefore, when the supporting portions 33, 36 formed in the first holding hole 31 and the second holding hole 34 are utilized, because the inclination in the radial direction and the inclination in the tangential direction which intersect perpendicularly each other, can be matched about the first objective lens 17 and the second objective lens 18, it becomes possible to suppress the relative tilt between the objective lenses.

Here, after the inclinations in the radial direction and the tangential direction are matched, the first objective lens 17 and the second objective lens 18 are fixed respectively on the first holding hole 31 or the second holding hole 34 by adhesive material or the like.

As for judgment whether the inclinations of the first objective lens 17 and the second objective lens 18 in the radial direction and the tangential direction are the same or not, a method is performed by utilizing, for example, a laser auto-collimator which is a well known apparatus that can measure inclination of an object to be measured without contacting. In the method, values which are related to inclinations of reflected lights at round edge surfaces 17b, 18b of the objective lenses 17, 18 are obtained, and the inclinations are judged as the same if those values match each other.

In the above described present embodiment, the structure is employed in which the supporting portions 33 formed in the first holding hole 31 are aligned to oppose in the radial direction, and the supporting portions 36 formed in the second holding hole 34 are aligned to oppose in the tangential direction. However, the present invention is not limited to this structure, and another structure may be no problem as far as the direction the supporting portions 33 are aligned to oppose and the direction the supporting portions 36 are aligned to oppose intersect perpendicularly.

Further, in the above described present embodiment, the structure is employed in which the upper surfaces of the supporting portions 33, 36 are curved surfaces. However, the present invention is not limited to this structure, and another structure may be no problem in which the upper surfaces of the supporting portions 33, 36 are flat surfaces. But the structure is employed to perform the tilting adjustment of the objective lenses using the supporting portions 33, 36 as the supporting points, it is preferable that area of the upper surface of the supporting portions 33, 36 are smaller when the upper surfaces are flat surfaces, and it is more preferable that the upper surfaces of the supporting portions 33, 36 are curved surfaces. At this point, because the relative tilt can be suppressed without the high accuracy dimensional control of the supporting portions 33, 36, to form the curved surfaces do not cause any problem of the additional process in the manufacturing operation.

In addition in the above described present embodiment, the objective lens actuator 21 has a structure so called sliding shaft type, however, the structure to suppress the relative tilt according to the present invention can be applied to the case other than the objective lens actuator of the sliding shaft type. That is, the present invention can be applied to the objective lens actuator, for example, so called wire supporting type that includes: a base 60, magnets 61 which are fixed on the base 60, a lens holder 62 which holds a first objective lens 65 and a second objective lens 66, wires 63 to support the lens holder 62, and driving coils 64, and the lens holder 62 is driven by an electromagnetic action between the magnets and the coils as shown in FIG. 8.

Further, in the above described present embodiment, explanation was given on the structure in which the first objective lens 17 is for a BD, and the second objective lens 18 is for a DVD and a CD, however, the present invention can be applied to any structure in which the respective objective lenses are utilized for other kinds of optical discs, of course.

Because the present invention can reduce the relative tilt between the objective lenses in the objective lens actuator which has two objective lenses with simple structure, it is useful in a case where the present invention is applied to the optical pickup device which has compatibility for a plurality of kinds of optical recording media.

What is claimed is:

1. An objective lens actuator comprising:
a first objective lens which condenses a light beam on a recording surface of an optical recording medium;
a second objective lens which is used interchangeably with the first objective lens to condense a light beam on the recording surface of the optical recording medium;
a lens holder which has a first holding portion to hold the first objective lens and a second holding portion to hold the second objective lens; and
a driving mechanism to move the lens holder at least in a focusing direction that is parallel to an optical axis of the objective lens and in a tracking direction that is parallel to a radial direction of the optical recording medium, wherein
a first supporting portion to support the first objective lens is arranged on the first holding portion,
a second supporting portion to support the second objective lens is arranged on the second holding portion,
the first supporting portion is composed of two portions that are disposed oppositely in a first direction to sandwich an optical axis of the objective lens to be held by the first holding portion, and
the second supporting portion is composed of two portions that are disposed oppositely in a second direction to sandwich an optical axis of the objective lens to be held by the second holding portion, and the second direction is perpendicular to the first direction.

2. The objective lens actuator according to claim 1, wherein
the first and second supporting portions are formed integrated with the lens holder.

3. The objective lens actuator according to claim 1, wherein
parts of the first and second supporting portions contacting with the objective lens are formed as curved surfaces.

4. The objective lens actuator according to claim 2, wherein
parts of the first and second supporting portions contacting with the objective lens are formed as curved surfaces.

5. An optical pickup device comprising the objective lens actuator according to claim 1.

6. An optical pickup device comprising the objective lens actuator according to claim 2.

7. An optical pickup device comprising the objective lens actuator according to claim 3.

8. An optical pickup device comprising the objective lens actuator according to claim 4.

* * * * *